United States Patent
Watanabe

(10) Patent No.: US 8,313,681 B2
(45) Date of Patent: Nov. 20, 2012

(54) METHOD OF MANUFACTURING SEAL PART

(75) Inventor: Shigeru Watanabe, Fujisawa (JP)

(73) Assignee: NOK Corporation (JP)

( * ) Notice: Subject to any disclaimer, the term of this patent is extended or adjusted under 35 U.S.C. 154(b) by 114 days.

(21) Appl. No.: 12/992,995

(22) PCT Filed: Apr. 17, 2009

(86) PCT No.: PCT/JP2009/057724
§ 371 (c)(1),
(2), (4) Date: Nov. 16, 2010

(87) PCT Pub. No.: WO2009/142082
PCT Pub. Date: Nov. 26, 2009

(65) Prior Publication Data
US 2011/0127692 A1    Jun. 2, 2011

(30) Foreign Application Priority Data

May 23, 2008   (JP) ................................. 2008-135301

(51) Int. Cl.
*B29C 45/14*   (2006.01)
*B29C 70/76*   (2006.01)

(52) U.S. Cl. ........ 264/273; 264/274; 264/275; 264/251; 264/328.12

(58) Field of Classification Search ......................... None
See application file for complete search history.

(56) References Cited

U.S. PATENT DOCUMENTS

| | | | | |
|---|---|---|---|---|
| 2,456,615 A | * | 12/1948 | Berglund | 264/273 |
| 2,621,369 A | * | 12/1952 | Gantz et al. | 29/469 |
| 3,191,950 A | * | 6/1965 | Hiltner | 277/611 |
| 4,116,124 A | * | 9/1978 | Farrow et al. | 101/170 |
| 5,075,066 A | * | 12/1991 | Terada et al. | 264/247 |
| 6,231,053 B1 | * | 5/2001 | Wakamatsu | 277/628 |
| 6,264,869 B1 | * | 7/2001 | Notarpietro et al. | 264/247 |
| 6,649,097 B2 | * | 11/2003 | Sasaki et al. | 264/102 |
| 6,667,124 B2 | * | 12/2003 | Suenaga et al. | 429/480 |
| 7,008,584 B2 | * | 3/2006 | Inoue et al. | 264/154 |
| 7,063,911 B1 | | 6/2006 | Nagai et al. | |
| 7,138,081 B2 | * | 11/2006 | Inoue et al. | 264/254 |
| 7,491,355 B2 | * | 2/2009 | Inoue et al. | 264/154 |
| 2003/0122281 A1 | | 7/2003 | Osawa et al. | |

(Continued)

FOREIGN PATENT DOCUMENTS

EP        1223629 A1    7/2002

(Continued)

*Primary Examiner* — Edmund H. Lee

(74) *Attorney, Agent, or Firm* — Harness, Dickey & Pierce, P.L.C.

(57) ABSTRACT

To form gaskets on both sides of a base material (5) without burrs, a first cavity (14) formed between the base material (5) and a first split mold (11) to have a molding material-supplying gate (11*b*) and a second cavity (15) formed between the base material (5) and a second split mold (12) communicate through a first communicating hole (51) provided in the base material (5), and there are formed in the first split mold (11) a first air vent hole (11*c*) open to a confluent portion of a molding material in the first cavity (14) and a second air vent hole (11*d*) which is positioned at and open to a second communicating hole (52) provided in the base material (5) at a confluent portion of the molding material in the second cavity (15), so as to be away from the surface of the base material (5).

2 Claims, 8 Drawing Sheets

U.S. PATENT DOCUMENTS

| | | | |
|---|---|---|---|
| 2005/0142414 A1* | 6/2005 | Kimura et al. | 429/34 |
| 2006/0269818 A1 | 11/2006 | Inoue et al. | |

FOREIGN PATENT DOCUMENTS

| | | |
|---|---|---|
| EP | 1312455 A2 | 5/2003 |
| EP | 1667264 A1 | 6/2006 |
| JP | 08-244074 A | 9/1996 |
| JP | 2001-121584 A | 5/2001 |
| JP | 2003-145588 A | 5/2003 |
| JP | 3820883 B2 | 9/2006 |
| WO | WO-2005/004264 A1 | 1/2005 |

\* cited by examiner

METHOD OF MANUFACTURING SEAL PART

CROSS-REFERENCE TO RELATED APPLICATIONS

This is a national stage of the International Application No. PCT/JP2009/057724 filed on Apr. 17, 2009 and published in the Japanese language. This application claims the benefit of Japanese Patent Application No. 2008-135301 filed on May 23, 2008. The disclosures of the above applications are incorporated herein by reference.

BACKGROUND OF THE INVENTION

1. Field of the Invention

The present invention relates to a method of manufacturing a seal part in which gaskets made of a rubber material or a synthetic resin material having a rubber-like elasticity are integrally formed on a film, a sheet or a plate-shaped base frame, for example, a fuel battery seal for sealing a flow path formed in each of fuel battery cells of a fuel battery stack.

2. Description of the Conventional Art

A fuel battery has a stack structure in which a fuel battery cell is formed by holding a power generation body including a membrane electrode assembly (MEA, a membrane-electrode complex), in which a pair of electrode layers are provided on both surfaces of an electrolytic membrane, by and between separators, and a lot of the fuel battery cells are laminated. Further, air (oxygen) is fed to one catalyst electrode layer (an air pole) from an air flow path formed in one surface of each of the separators, fuel gas (hydrogen) is fed to the other catalyst electrode layer (a fuel pole) from a fuel gas flow path formed in the other surface of each of the separators, and electric power is generated in accordance with an electrochemical reaction corresponding to a reverse reaction to an electrolytic process of water, that is, a reaction that the water is generated from hydrogen and oxygen.

Accordingly, each of the fuel battery cells is provided with a seal part for preventing a leakage of the fuel gas, the air, the water generated by the electrochemical reaction mentioned above, surplus air and the like. Further, as this kind of seal part, there has been known a seal part in which gaskets made of a rubber material or a synthetic resin material having a rubber-like elasticity are integrated with a separator or a film-shaped, sheet-shaped or plate-shaped base material such as a synthetic resin film or the like (refer, for example, to Japanese Patent No. 3820883).

FIG. 7 is a sectional view showing a seal part in which gaskets are integrally formed on both surfaces of a thin plate shaped base material, and FIG. 8 is a sectional view showing a conventional art for manufacturing the seal part in FIG. 7.

In this case, the seal part shown in FIG. 7 is provided with a thin plate shaped base material 1, and gaskets 2 which are integrally provided on both front and back faces thereof and are made of a rubber material or a synthetic resin material having a rubber-like elasticity, and these gaskets 2 have base portions 2a which are adhered to the base material 1, and seal lips 2b which protuberate in a ridge shape from upper surfaces thereof, and are brought into close contact with laminated separators (not shown) or the like with an appropriate collapsing margin, thereby achieving a sealing function with respect to the fuel gas or the air mentioned above.

In this seal part, the gaskets 2 are integrally formed on the base material 1 in accordance with a known molding method such as a liquid injection molding (LIM) or the like by using a liquid molding material. In detail, as shown in FIG. 8, a metal mold 100 constructed by split molds 101 to 103 is used, the base material 1 is positioned and fixed between the split molds 102 and 103, and the liquid molding material is filled into annular cavities 104 and 105 which are defined between the base material 1 and inner surfaces of the split molds 102 and 103 and communicate with each other via a communicating hole 1a provided in the base material 1, through a sprue 100a, a runner 100b and a gate 100c which are formed in the split molds 101 and 102, and hardened by cross linking.

In this case, since the gaskets 2 are made in an annular continuous shape (an endless shape), and the cavities 104 and 105 forming this have the same shape, the liquid molding material filled in the cavities 104 and 105 via the gate 100c and the communicating hole 1a is branched into both sides in peripheral directions to flow within the cavities 104 and 105 from the gate 100c and the communicating hole 1a, and so branched flows meet at an opposite side to the gate 100c and the communicating hole 1a. Further, since a molding defect caused due to remaining air, and vaporizing gas from the molding material tends to be caused in those confluent portions 104a and 105a, air vent grooves 104b and 105b for discharging out the remaining air and the vaporizing gas are formed along contact surfaces between the base material 1 and the split molds 102 and 103. Accordingly, a seal part manufactured in accordance with the method mentioned above is structured, as shown in FIG. 7, such that burrs 2c extending along a surface of the base material 1 from the base portions 2a of the gaskets 2 are formed by the molding material flowed into the air vent grooves 104b and 105b.

However, in accordance with the forming method as mentioned above, for example, in the case that the seal lips 2b of the gasket 2 are brought into close contact with bottom surfaces of grooves formed in the separators, the burrs 2c formed by the air vent grooves 104b and 105b do not enter in the grooves, adversely affects a sealing performance of the gaskets 2, and cause a strain of the base material 1. Accordingly, it is necessary to remove the burrs 2c mentioned above after forming the gaskets 2. Particularly, since the burrs 2c exist on both surfaces of the base material 1 in the case that the gaskets 2 are provided on both surfaces of the base material 1, it takes an enormous time to carry out a removing work, and there is a risk that the base material 1 is broken at a time of removing the burrs.

SUMMARY OF THE INVENTION

Problem to be Solved by the Invention

The present invention is made by taking the points mentioned above into consideration, and a technical object of the present invention is to provide a method which can form a gasket on both surfaces of a base material without forming any burr on a surface of the base material.

Means for Solving the Problems

As a means for effectively achieving the technical object mentioned above, according to the first aspect of the present invention, there is provided a method of manufacturing a seal part in which gaskets are integrally formed on both surfaces of a film-shaped, sheet-shaped or plate-shaped base material, the method comprising the steps of:

making a first cavity which is defined between the base material and a first split mold contacting to one side of the base material and to which a molding material-supplying gate is open, and a second cavity which is defined between the base material and a second split mold contacting to the other side of the base material, to communicate with each other via a first communicating hole which is provided in the base material; and providing, in the first split mold, a first air vent hole which is open to a confluent portion of the molding material in the first cavity, and a second air vent hole which is positioned at and open to a second communicating hole provided in the base material at a confluent portion of the molding material in the second cavity so as to be away from the surface of the base material.

In other words, in this method, the molding material fed to the first cavity from the molding material-supplying gate is fed to the second cavity via the first communicating hole provided in the base material, the remaining air and the vaporizing gas from the confluent portion of the molding material in the first cavity are discharged via the first air vent hole in the first split mold, and the remaining air and the vaporizing gas from the confluent portion of the molding material in the second cavity are discharged via the second communicating hole in the base material and the second air vent hole in the first split mold. Further, since the first and second air vent holes are both provided in the first split mold, a metal mold split structure does not become complicated, and since the burrs formed in the first and second air vent holes are away from the surface of the base material, it is possible to easily carry out a removing work.

Further, according to the second aspect of the present invention, there is provided a method of manufacturing a seal part in which a gasket is integrally formed on both surfaces of a film-shaped, sheet-shaped or plate-shaped base material, the method comprising the steps of:

making a first cavity which is defined between the base material and a first split mold contacting to one side of the base material and to which a molding material-supplying gate is open, and a second cavity which is defined between the base material and a second split mold contacting to the other side of the base material, to communicate with each other via a first communicating hole which is provided in the base material at a position corresponding to the molding material-supplying gate, and a second communicating hole which is provided in the base material at a confluent portion of the molding material in the first and second cavities; and providing, in the first split mold, an air vent hole which is open to a position corresponding to the second communicating hole so as to be away from the surface of the base material.

In other words, in this method, the molding material fed to the first cavity from the molding material-supplying gate is fed to the second cavity via the first communicating hole provided in the base material, the remaining air and the vaporizing gas from the confluent portion of the molding material in the first cavity are discharged via the air vent hole in the first split mold, and the remaining air and the vaporizing gas from the confluent portion of the molding material in the second cavity are also discharged by the air vent hole through the second communicating hole in the base material. Accordingly, since the air vent hole functions as two air vent means from both the first and second cavities, a metal mold split structure does not become complicated, and since the burr formed in the air vent hole is away from the surface of the base material, and the number of the burr formed positions is reduced, it is possible to easily carry out a burr removing work.

Effect of the Invention

In accordance with the method of manufacturing the seal part on the basis of the first aspect of the present invention, since the remaining air and the vaporizing gas from the confluent portions of the molding material in the first and second cavities at both sides of the base material are discharged from the first and second air vent holes provided in the first split mold, in the process of forming the gaskets on both surfaces of the base material, it is possible to achieve such an effect that the metal mold structure does not become complicated, and the burr is not formed on the surface of the base material.

In accordance with the method of manufacturing the seal part on the basis of the second aspect of the present invention, in addition to the same effect as the first aspect, since the remaining air and the vaporizing gas from the confluent portions of the molding material in the first and second cavities at both sides of the base material are discharged from the air vent hole which the first and second cavities have in common, it is possible to further simplify the metal mold structure.

DETAILED DESCRIPTION OF PREFERRED EMBODIMENTS

A description will be given below of a preferable embodiment of a method of manufacturing a seal part in accordance with the present invention with reference to the accompanying drawings. First of all, FIG. 1 is a sectional view showing a seal part in which gaskets having different extension shapes from each other are formed integrally on both surfaces of a base material.

Figure 1:
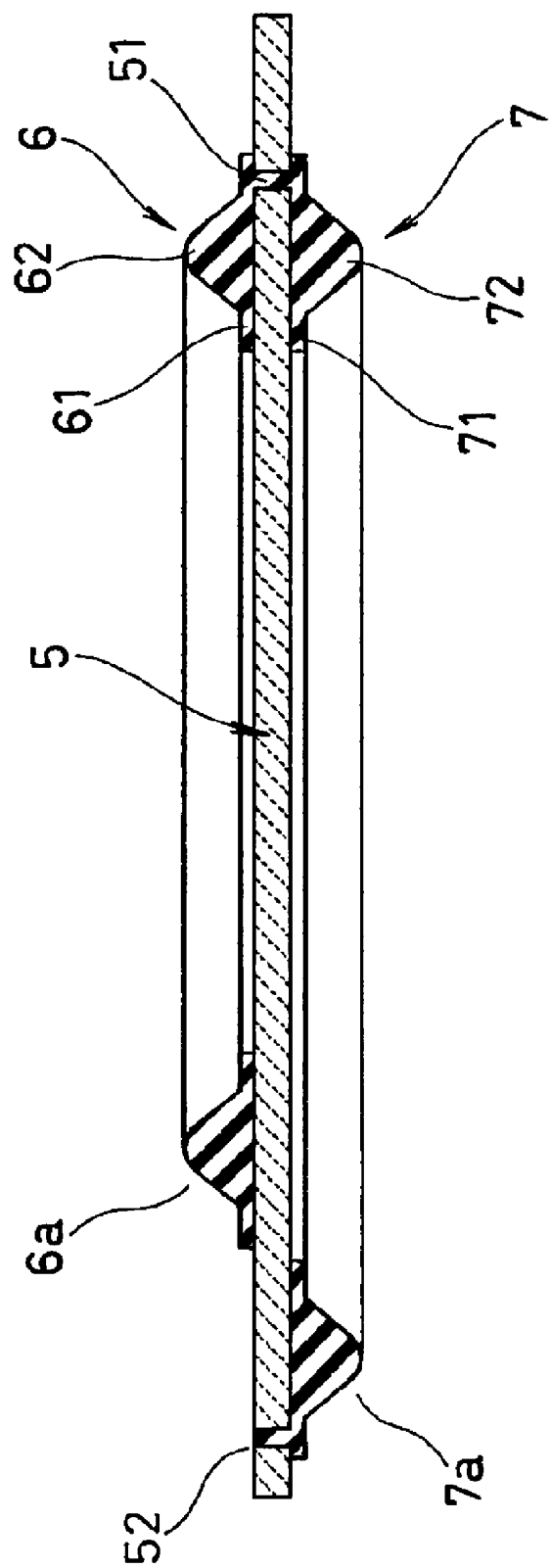
FIG. 1 is a sectional view showing a seal part in which gaskets having different extension shapes from each other are formed integrally on both surfaces of a base material.

The seal part shown in FIG. 1 is used as a sealing means of each of cells in a fuel battery, and is structured such that gaskets 6 and 7 having different extension shapes (lip lines) from each other are formed integrally on both surfaces of a base material 5.

In detail, the base material 5 is made, for example, of a synthetic resin film, a carbon plate, ceramics, a metal porous material, a metal thin plate or the like, however, is not particularly limited thereto. The gaskets 6 and 7 are made of a rubber material or a synthetic resin material having a rubber-like elasticity, and is made in an annular continuous shape (an endless shape) along the vicinity of an outer periphery of the base material 5. Further, the gaskets 6 and 7 have base portions 61 and 71 which are adhered to surfaces of the base material 5, and seal lips 62 and 72 which protuberate in a ridge shape from upper surfaces thereof, and peripheral parts 6a and 7a extend at different positions from each other, that is, the gaskets 6 and 7 are formed in different extension shapes from each other on both sides of the base material 5.

In other words, since the seal lips 62 and 72 of the gaskets 6 and 7 are brought into close contact with surfaces of other materials (separators or the like) (not shown) with an appropriate collapsing margin, the seal part has a function of preventing oxygen fed to an air pole from being mixed into a flow path of hydrogen gas fed to a fuel pole, conversely preventing the hydrogen gas from being mixed into an air flow path, and preventing a power generation efficiency from being lowered.

Figure 2:
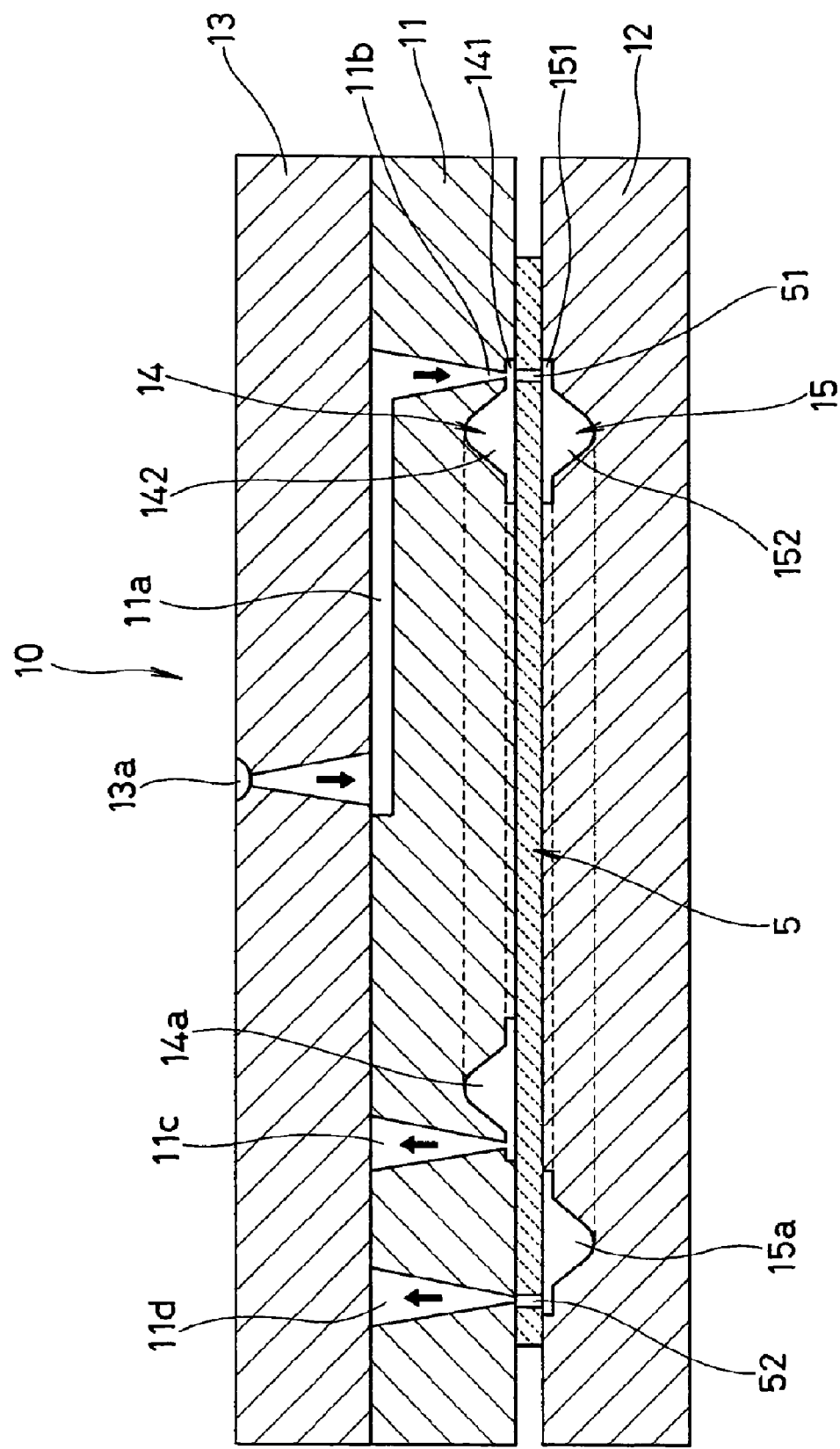
FIG. 2 is a sectional view of a metal mold and the base material and shows a method of manufacturing a seal part in accordance with the present invention for manufacturing the seal part in FIG. 1.

FIG. 2 is a sectional view of a metal mold and the base material and shows a method of manufacturing a seal part in accordance with the present invention for manufacturing the seal part in FIG. 1 which is provided with the structure mentioned above, and FIG. 3 is a plan view showing a relationship between cavities of the metal mold and the base material in FIG. 2.

In FIG. 2, reference numeral 10 denotes a metal mold for integrally forming gaskets on both surfaces of the base material 5, and the metal mold 10 is provided with a first split mold 11 and a second split mold 12 which can hold the base material 5 in between and are arranged so as to be movable forward and backward with each other, and a third split mold 13 which is connected to the first split mold 11. The base material 5 can be set at a predetermined position on an inner surface (an upper surface) of the second split mold 12, and a first cavity 14 and a second cavity 15 respectively forming the gaskets are defined between the set base material 5 and the inner surfaces of the first split mold 11 and the second split mold 12 which are provided at both upper and lower sides of the base material, in an illustrated mold clamping state.

Figure 3:
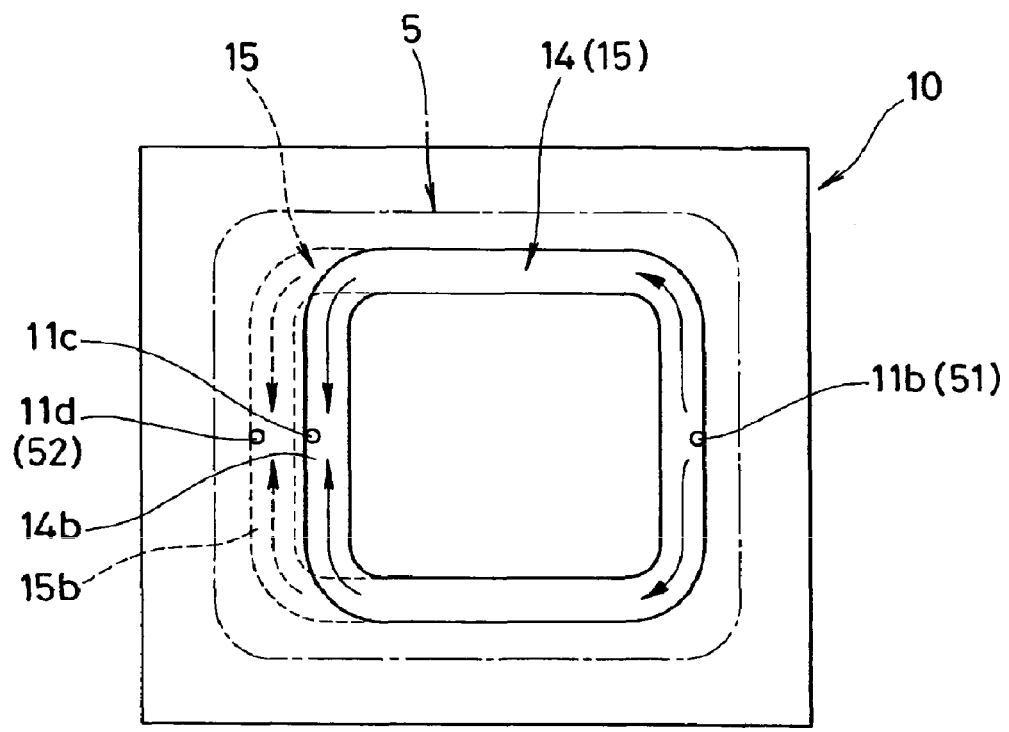
FIG. 3 is a plan view showing a relationship between cavities of the metal mold and the base material in FIG. 2.

The first cavity 14 and the second cavity 15 have sectional shapes which correspond in negative and positive relation to the gaskets 6 and 7 shown in FIG. 1, are made in an annular continuous shape (an endless shape) along the vicinity of the outer periphery of the base material 5 which is set between the first split mold 11 and the second split mold 12, and have shallow base forming portions 141 and 151, and seal lip forming portions 142 and 152 which become deeper approximately in a V-shape from the middles in a width direction thereof. Further, as shown in FIGS. 2 and 3, the first cavity 14 and the second cavity 15 are connected with each other between the base forming portions 141 and 151 via a first communicating hole 51 which is provided in the base material 5, peripheral parts 14a and 15a, which are in more detail, the parts at opposite sides in a peripheral direction to the position at which the first communicating hole 51 is provided, extend at different positions from each other, and thus the first cavity 14 and the second cavity 15 are formed in different extension shapes from each other on both sides of the base material 5.

The third split mold 13 is provided with a sprue 13a corresponding to a molding material filling port from a molding machine (not shown), and the first split mold 11 is provided with a runner 11a extending from the sprue 13a and a gate (a molding material-supplying gate) 11b formed at a downstream end of the runner 11a. The gate 11b is open to the base forming portion 141 in the first cavity 14 so as to correspond to an opening position of the first communicating hole 51 in the base material 5. In this case, an opening diameter of the first communicating hole 51 is formed larger in comparison with an opening diameter of the gate 11b.

The base material 5 is provided with a second communicating hole 52 in addition to the first communicating hole 51. The second communicating hole 52 is positioned at the peripheral part 15a of the second cavity 15, that is, an opposite side in a peripheral direction to the opening position of the first communicating hole 51, and is open at a position at which flows of the molding material filled into the second cavity 15 through the first communicating hole 51 from the first cavity 14 meet, as shown in FIG. 3.

The first split mold 11 is provided with a first air vent hole 11c and a second air vent hole 11d. One end of the first air vent hole 11c is open to the confluent portion of the molding material which is filled into the first cavity 14 from the gate 11b, in the peripheral part 14a of the first cavity 14, and the other end thereof is open to a contact surface between the first split mold 11 and the third split mold 13. Further, one end of the second air vent hole 11d is open to a position corresponding to the second communicating hole 52 in the base material 5, at the confluent portion of the molding material which is filled into the second cavity 15 through the first communicating hole 51 from the first cavity 14, in the peripheral part 15a of the second cavity 15, and the other end thereof is open to the contact surface between the first split mold 11 and the third split mold 13.

In this case, the first air vent hole 11c is open to the base forming portion 141 in the first cavity 14, similarly to the gate 11b, and the second air vent hole 11d is open to the base forming portion 151 in the second cavity 15. Accordingly, the first air vent hole 11c and the second air vent hole 11d are open to the positions which are away from the surface of the base material 5.

In case of molding by means of the metal mold 10 mentioned above, the base material 5 is positioned and set to clamp the mold as shown in FIG. 2, the first cavity 14 and the second cavity 15 are previously evacuated via the first air vent hole 11c and the second air vent hole 11d by means of a vacuum pump (not shown) or the like, and a liquid molding material is thereafter injected into the first cavity 14 via the sprue 13a, the runner 11a and the gate 11b by means of a molding machine (not shown), whereby a part of the molding material is almost simultaneously filled in the second cavity 15 through the first communicating hole 51 of the base material 5 which is positioned just below the gate 11b. In this case, a material having an adhesive property with respect to the base material 5 is preferably employed as the liquid molding material, however, in the case of using a molding material having no adhesive property, an adhesive agent is previously applied to the base material 5.

At a time of filling the molding material, the molding material flows within the first cavity 14 so as to branch into both sides from the gate 11b, and so branched flows again meet at an opposite side in the peripheral direction to the gate 11b, as shown in FIG. 3. Further, since an inner side of the first air vent hole 11c existing at this confluent position is depressurized, remaining air and vaporizing gas from the molding material are discharged, and the molding material further flows into the first air vent hole 11c while the branched flows meet. Accordingly, branched flow meeting and conflation of the molding material are well carried out. Further, since air bubbles made by the remaining air and the vaporizing gas flow out to the first air vent hole 11c together with a part of the molding material even if they mix into the confluent portion, it is possible to effectively prevent a defect in molding from being caused.

In the same manner, the molding material flows within the second cavity 15 so as to branch into both sides from the first communicating hole 51, and so branched flows meet again at an opposite side in the peripheral direction to the first communicating hole 51. Further, since the inner side of the second air vent hole 11*d* which is open to the second communicating hole 52 existing at the confluent position is depressurized, the remaining air and the vaporizing gas from the molding material are discharged, and the molding material further flows into the second air vent hole 11*d* via the second communicating hole 52 while the branched flows meet. Further, since the air bubbles caused by the remaining air and the vaporizing gas flow out to the second air vent hole 11*d* via the second communicating hole 52 together with a part of the molding material even if they mix into the confluent portion, it is possible to effectively prevent a defect in molding from being caused.

Further, as a result of the fact that the discharge of the remaining air and the vaporizing gas is easily carried out by the first air vent hole 11*c* and the second air vent hole 11*d*, it is possible to make molding pressure low. Accordingly, it is useful as a method of integrally forming the gaskets 6 and 7 on the base material 5 made of a brittle material such as carbon or ceramics.

The molding material filled into the first and second cavities 14 and 15 is hardened by cross linking and, whereby the gaskets 6 and 7 made of the rubber material or the synthetic resin material having the rubber-like elasticity are integrally formed on the base material 5, as shown in FIG. 1.

In the molding process mentioned above, a burr (not shown) formed by a part of the molding material flowing into the first air vent hole 11*c* is positioned on the upper surface of the base portion 61 of the gasket 6 shown in FIG. 1, similarly to the burr (not shown) formed by the molding material within the gate 11*b*. Further, a burr (not shown) formed by a part of the molding material flowing into the second air vent hole 11*d* extends from the inner side of the second communicating hole 52 in the base material 5. Accordingly, since the removal of the burrs does not need to such a complicated work as to peel or cut off them from the surface of the base material 5, it is possible to easily remove, and since removal traces of the burrs are not formed on the seal lips 62 and 72, they do not adversely affect a sealing performance.

Figure 7:
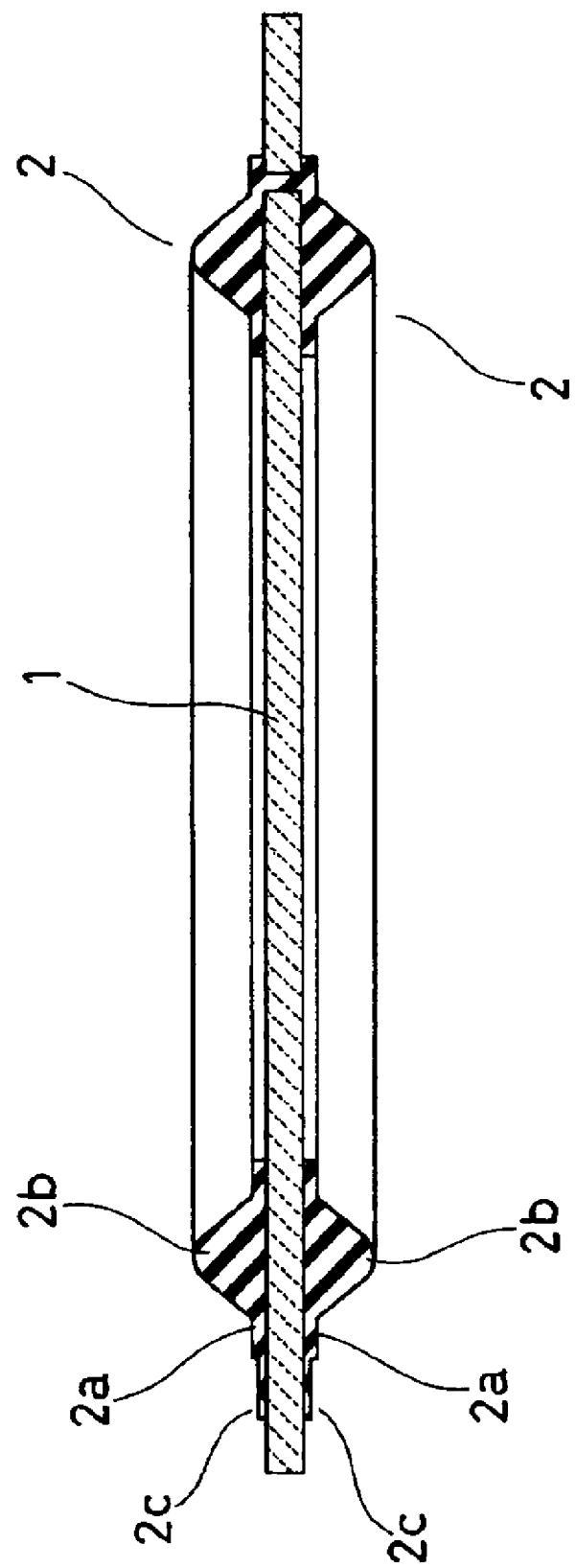
FIG. 7 is a sectional view showing a seal part in which gaskets are integrally formed on both surfaces of a thin plate shaped base material.
Figure 8:
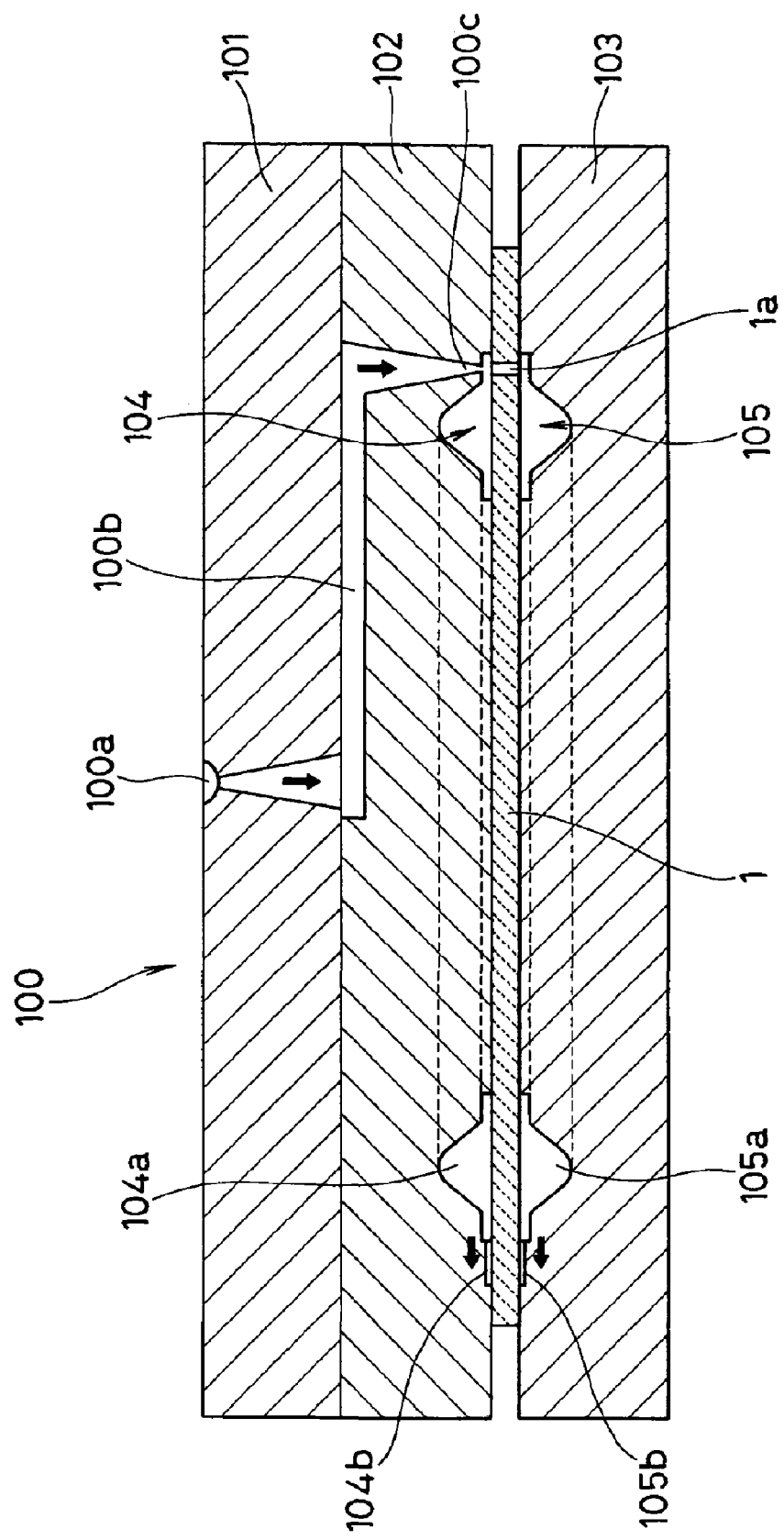
FIG. 8 is a sectional view showing a conventional art for manufacturing the seal part in FIG. 7.

Further, in the seal part manufactured by the method mentioned above, since the conventional burrs (reference symbol 2*c* in FIG. 7) formed by the air vent grooves do not exist on the surface of the base material 5, it is possible to effectively prevent a strain caused by compression stress of the burrs from being generated in the base material 5 and the other material in a laminated state as a fuel battery stack, effectively prevent an unevenness in the surface pressure of the seal lips 62 and 72 of the gaskets 6 and 7 from being generated thereby to deteriorate the sealing performance, and effectively prevent a size in a laminating direction from being enlarged due to an interposition of the burrs.

Further, since the burrs formed by the first air vent hole 11*c* and the second air vent hole 11*d* do not protrude to an outer peripheral side or an inner peripheral side along the surface of the base material 5, it is possible to downsize the base material 5 at that degree.

Figure 4:
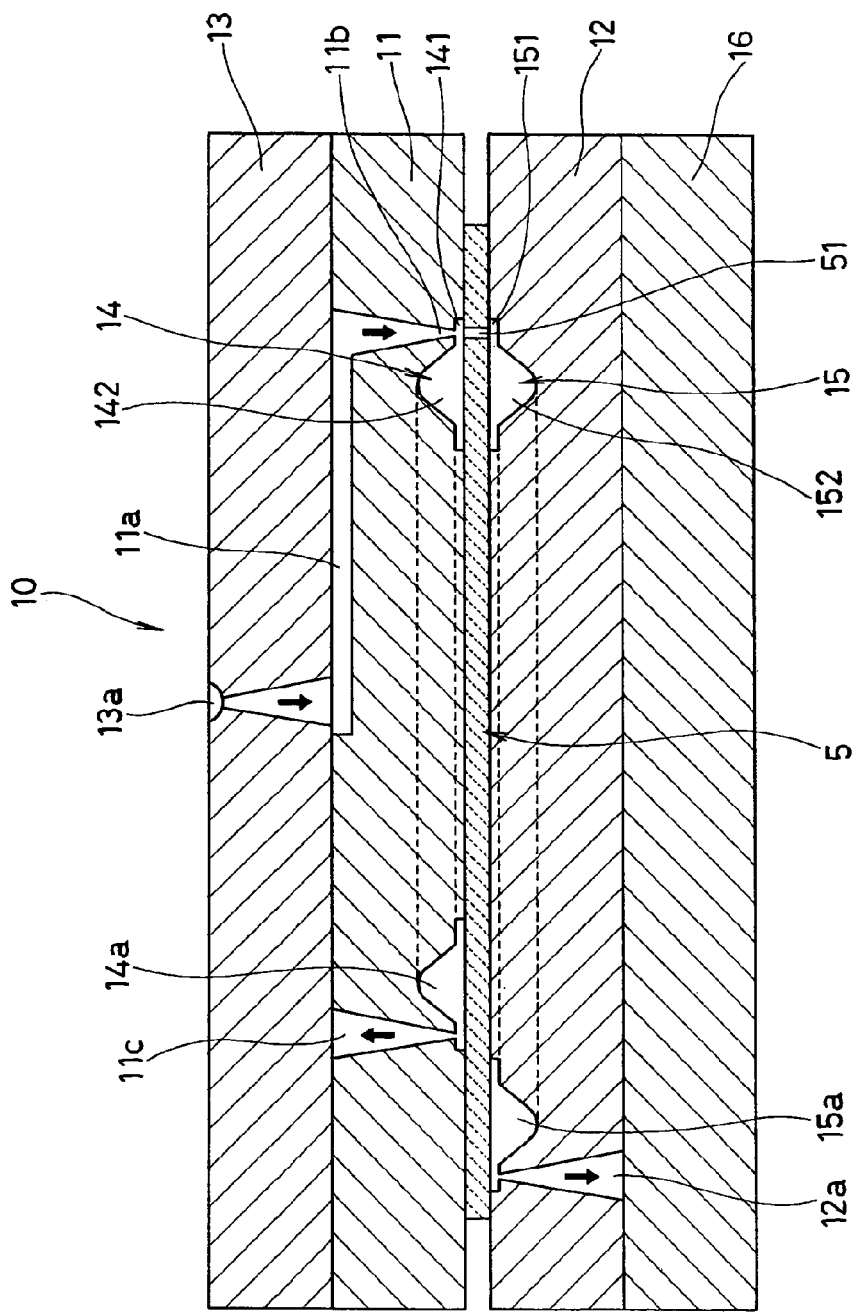
FIG. 4 is a sectional view of a metal mold and a base material and shows a comparative example of the method of manufacturing a seal part.

Then, FIG. 4 is a sectional view of a metal mold and a base material and shows a comparative example of the method of manufacturing the seal part.

As a method of carrying out an air vent in such a manner as to prevent the conventional burrs (reference symbol 2*c* in FIG. 7) from being formed by the air vent grooves in the forming process of the gaskets 6 and 7, in the manufacturing of the seal part in which the gaskets 6 and 7 having the different extension shapes from each other are integrally formed on both surfaces of the base material 5, as shown in FIG. 1, there can be thought such a structure that the metal mold 10 is provided with a fourth split mold 16 connected to the second split mold 12, the second air vent hole 12*a* is provided in the second split mold 12, one end thereof is open to an opposite side in a peripheral direction to the first communicating hole 51 in the second cavity 15 (the confluent portion of the molding material in the second cavity 15), and the other end is open to the contact surface between the second split mold 12 and the fourth split mold 16, like as a comparative example shown in FIG. 4.

However, in this case, since the fourth split mold 16 is necessary, not only the metal mold 10 is enlarged in size, but also a split structure thereof becomes complicated. Further, since the burr by the second air vent hole 12*a* is formed at the opposite side to the burr formed by the gate 11*b* and the burr formed by the first air vent hole 11*c*, the removing work of the burrs is complicated.

On the contrary, in the method shown in FIG. 2, since the fourth split mold 16 like as the comparative example shown in FIG. 4 is not necessary, and the burrs by the first air vent hole 11*c* and the second air vent hole 11 d are formed at the same side as the burr by the gate 11*b*, the removing work of the burrs is easy, and it is significantly advantageous in these regards.

Figure 5:
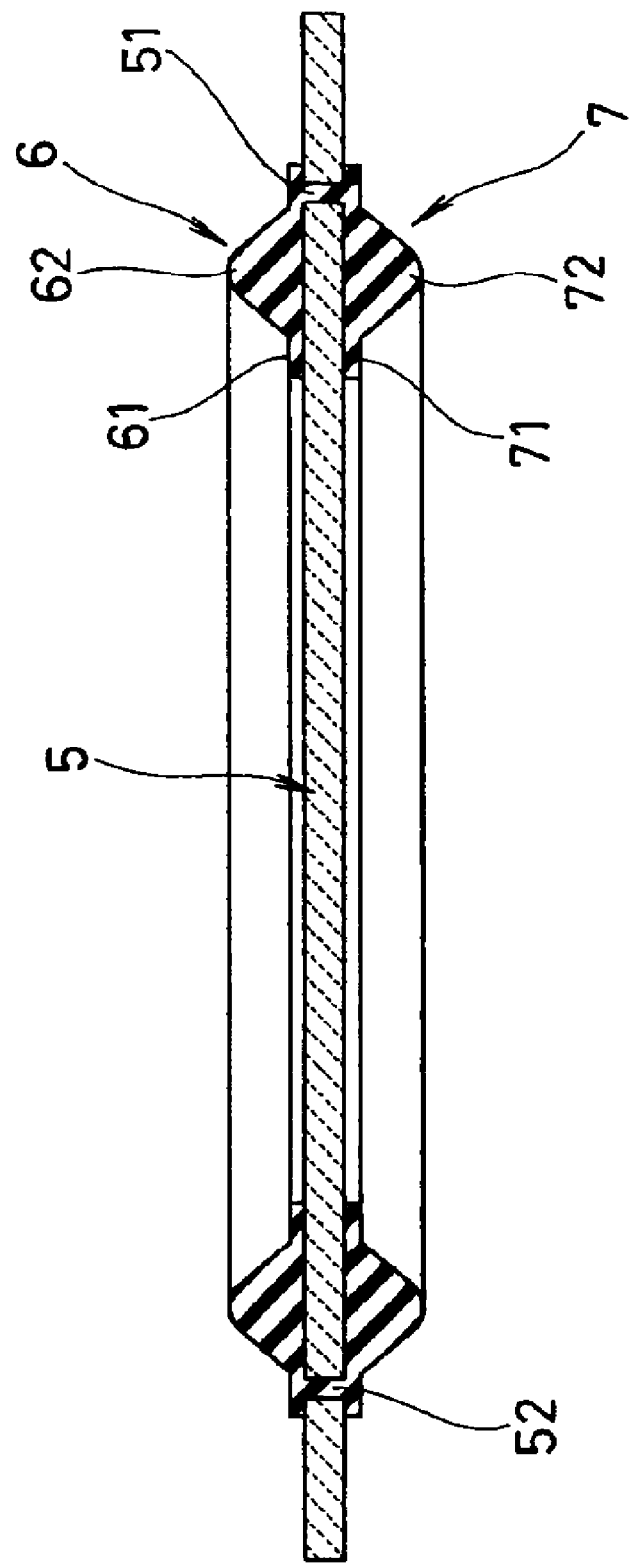
FIG. 5 is a sectional view showing a seal part in which gaskets having the same extension shape are formed integrally on both surfaces of a base material.
Figure 6:
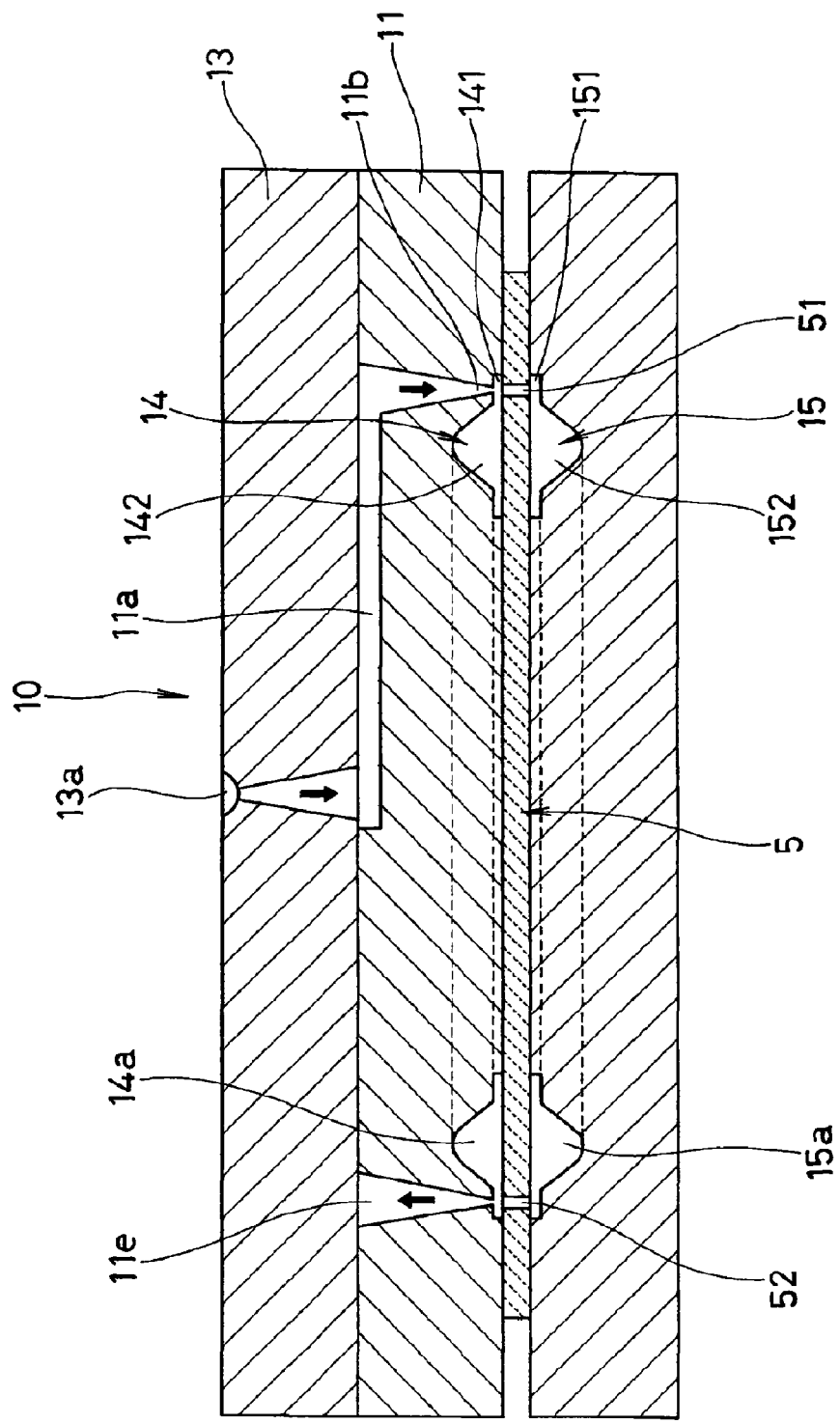
FIG. 6 is a sectional view of a metal mold and the base material and shows a method of manufacturing a seal part in accordance with the present invention for manufacturing the seal part in FIG. 5.

Next, FIG. 5 is a sectional view showing a seal part in which gaskets having the same extension shape are formed integrally on both surfaces of the base material, and FIG. 6 is a sectional view of the metal mold and the base material and shows a method of manufacturing a seal part in accordance with the present invention for manufacturing the seal part in FIG. 5.

The seal part shown in this FIG. 5 differs from the seal part shown in FIG. 1, which has been previously described, in such a point that the extension shapes (the lip lines) of the gaskets 6 and 7 which are formed integrally on both surfaces of the base material 5 are identical to each other.

Accordingly, in a metal mold 10 shown in FIG. 6, the first cavity 14 and the second cavity 15 for forming the gaskets which are defined on both upper and lower sides of the base material 5 by the first split mold 11 and the second split mold 12 extend so as to form an identical extension shape to each other, in the mold clamping state.

The base material 5 is provided with the first communicating hole 51 and the second communicating hole 52. Among them, the first communicating hole 51 is open to the base forming portion 141 of the first cavity 14 and the base forming portion 151 of the second cavity 15 at a position corresponding to the gate 11*b* provided in the first split mold 11. Further, the second communicating hole 52 is positioned at an opposite side in the peripheral direction of the first cavity 14 and the second cavity 15 with respect to the opening position of the first communicating hole 51, in other words, is open to confluent positions at which the branched flows of the molding material filled into the first cavity 14 and the second cavity 15 through the gate 11*b* and the first communicating hole 51 meet. Accordingly, the first cavity 14 and the second cavity 15 communicate with each other via the first communicating hole 51 and the second communicating hole 52.

Further, an air vent hole 11 e is provided in the first split mold 11. One end of the air vent hole 11*e* is open to the base forming portion 141 at a position corresponding to the second communicating hole 52 in the base material 5 at the confluent portion of the molding material filled into the first cavity 14 from the gate 11*b* in the peripheral part 14*a* in the first cavity 14, and the other end thereof is open to the contact surface between the first split mold 11 and the third split mold 13. Accordingly, the air vent hole 11*e* is open at a position which is away from the surface of the base material 5.

In this case, the other portions can be basically structured in the same manner as those of FIG. 2 which has been previously described.

In case of molding by means of the metal mold 10 mentioned above, the base material 5 is positioned and set to clamp the mold as shown in FIG. 6, the first cavity 14 and the second cavity 15 are previously evacuated via the air vent hole 11e by means of a vacuum pump (not shown) or the like, and a liquid molding material is thereafter injected into the first cavity 14 via the sprue 13a, the runner 11a and the gate 11b by means of a molding machine (not shown), whereby a part of the molding material is almost simultaneously filled in the second cavity 15 through the first communicating hole 51 of the base material 5 which is positioned just below the gate 11b. In this case, a material having an adhesive property with respect to the base material 5 is preferably employed as the liquid molding material, however, in the case of using a molding material having no adhesive property, an adhesive agent is previously applied to the base material 5.

At a time of filling the molding material, the molding material flows within the first cavity 14 so as to branch into both sides from the gate 11b, and so branched flows meet again at an opposite side in the peripheral direction to the gate 11b, and it flows within the second cavity 15 so as to branch into both sides from the first communicating hole 51 so branched flows meet again at an opposite side in the peripheral direction to the first communicating hole 51. Further, since an inner side of the air vent hole 11e which is open to the confluent portion of the molding material in the first cavity 14 is depressurized, remaining air and vaporizing gas from the molding material in the confluent portion in the first cavity 14 are discharged from this air vent hole 11e, remaining air and vaporizing gas from the molding material in the confluent portion in the second cavity 15 are discharged from the air vent hole 11e via the second communicating hole 52, and the molding material within the first cavity 14 and the second cavity 15 further flows into the air vent hole 11e while the flows in both the cavities meet via the second communicating hole 52. Accordingly, flow meeting and conflation of the molding material are well carried out. Further, since air bubbles made by the remaining air and the vaporizing gas flow out to the air vent hole 11e together with a part of the molding material even if they mix into the confluent portion, it is possible to effectively prevent a defect in molding from being caused.

The molding material filled into the first and second cavities 14 and 15 is hardened by cross linking, whereby the gaskets 6 and 7 made of the rubber material or the synthetic resin material having the rubber-like elasticity are integrally formed on the base material 5, as shown in FIG. 5.

In the molding process mentioned above, since a burr (not shown) formed by a part of the molding material flowing into the air vent hole 11e is positioned on the upper surface of the base portion 61 of the gasket 6 shown in FIG. 5, similarly to the burr (not shown) formed by the molding material within the gate 11b, the removal of the burr does not need to such a complicated work as to peel or cut off it from the surface of the base material 5. Further, since the air vent hole 11e functions as both an air vent means from the first cavity 14 and an air vent means from the second cavity 15, the number of the burrs formed thereby is reduced. Therefore, it is possible to easily remove the burr, and since a removal trace of the burr is not formed on the seal lips 62 and 72, it does not adversely affect a sealing performance.

Further, in the seal part manufactured by the method mentioned above, since the conventional burrs (reference symbol 2c in FIG. 7) formed by the air vent grooves do not exist on the surface of the base material 5, it is possible to effectively prevent a strain caused by compression stress of burrs from being generated in the base material 5 and the other material in a laminated state as a fuel battery stack, effectively prevent an unevenness in the surface pressure of the seal lips 62 and 72 of the gaskets 6 and 7 from being generated thereby to deteriorate the sealing performance, and effectively prevent a size in a laminating direction from being enlarged due to an interposition of the burrs.

What is claimed is:

1. A method of manufacturing a seal part in which gaskets are integrally formed on both surfaces of a film-shaped, sheet-shaped or plate-shaped base material, the method comprising the steps of:

making a first cavity which is defined between said base material and a first split mold contacting to one side of said base material and to which a molding material-supplying gate is open, and a second cavity which is defined between said base material and a second split mold contacting to the other side of said base material, to communicate with each other via a first communicating hole which is provided in said base material; and providing, in said first split mold, a first air vent hole which is open to a confluent portion of a molding material in said first cavity, and a second air vent hole which is positioned at and open to a second communicating hole provided in said base material at a confluent portion of the molding material in said second cavity so as to be away from the surface of said base material.

2. A method of manufacturing a seal part in which gaskets are integrally formed on both surfaces of a film-shaped, sheet-shaped or plate-shaped base material, the method comprising the steps of:

making a first cavity which is defined between said base material and a first split mold contacting to one side of said base material and to which a molding material-supplying gate is open, and a second cavity which is defined between said base material and a second split mold contacting to the other side of said base material, to communicate with each other via a first communicating hole which is provided in said base material at a position corresponding to said molding material-supplying gate, and a second communicating hole which is provided in said base material at a confluent portion of a molding material in said first and second cavities; and providing, in said first split mold, an air vent hole which is open to a position corresponding to said second communicating hole so as to be away from the surface of said base material;

the second communicating hole and the air vent hole corresponding to the second communicating hole are provided at an outer peripheral side of said first cavity.

* * * * *